May 21, 1968    J. A. RIETDIJK ET AL    3,383,871
APPARATUS FOR TRANSPORTING COLD TO A REMOTE
LOCATION USING AN EXPANSION EJECTOR
Filed Oct. 7, 1966    3 Sheets-Sheet 1

INVENTORS
JOHAN A. RIETDIJK
GIJSBERT PRAST
BY
AGENT

INVENTORS
JOHAN A. RIETDIJK
GIJSBERT PRAST 3,383,871
APPARATUS FOR TRANSPORTING COLD TO
A REMOTE LOCATION USING AN EXPAN-
SION EJECTOR
Johan Adriaan Rietdijk and Gijsbert Prast, Emmasingel,
Eindhoven, Netherlands, assignors to North American
Philips Co., Inc., New York, N.Y., a corporation of
Delaware
Filed Oct. 7, 1966, Ser. No. 585,153
Claims priority, application Netherlands, Oct. 9, 1965,
65—13,118
6 Claims. (Cl. 62—6)

ABSTRACT OF THE DISCLOSURE

Transport of cold from a cold source such as a cold gas refrigerator to a remote location using an expansion ejector. The supply device for medium provides only a small flow while the ejector provides a much greater flow of medium in the duct system thereby resulting in smaller losses of cold or heat.

---

The invention relates to a device comprising a source of cold or heat, for example, a cold-gas refrigerator or a nuclear reactor and a duct system in which a medium can circulate for transferring cold or heat respectively from the source to a place to be cooled or heated respectively. The duct system includes at least one heat exchanger in which said medium can exchange heat with the source and at least one heat exchanger in which the medium can exchange heat with the place to be cooled or heated respectively, said duct system furthermore includes a device for circulating the medium therein.

The known devices of the type set forth have a device for circulating the medium formed by a ventilator or pump included in the duct system. In this device the place to be cooled or heated is at a given temperature while for reasons of efficiency it is desirable that the source of cold or heat should have only a small temperature difference with respect to the remote place. This means that it is desirable that a small temperature difference should prevail across the heat exchangers in the duct system. For this purpose the transfer of a given quantity of cold or heat requires the maintenance of a comparatively large flow of medium, which involves a comparatively large ventilator or pump, which is, of course, disadvantageous.

A further disadvantage of the known devices is that the ventilator or the pump, due to their large size and the temperature which is equal to that of the circulating medium, causes a comparatively great loss of cold or heat respectively. This loss plays an important part particularly in cold systems operating at very low temperatures, for example, below 100° K.

The system according to the invention has for its principal object to overcome said disadvantages and wherein the device for circulating the medium is formed by at least one ejector. The outlet and the suction end of the injector communicate with the duct system while the primary medium supply communicates with a device containing the same medium as that of the duct system and is capable of supplying it at substantially the same temperature and under a higher pressure than the medium of the duct system to said inlet. The duct system is furthermore provided with a medium outlet.

In this system, the device for supplying high-pressure medium to the ejector need provide only a comparatively small flow while the ejector provides a much greater flow of circulating medium in the duct system. This means that the size of the device for supplying high-pressure medium may be small, so that the loss of cold or heat will be small.

In a further advantageous embodiment of the system according to the invention the ejector communicates by its primary medium inlet through a heat exchanger with the outlet of compressed medium of a compression device while the medium outlet of the duct system also communicates through said heat exchanger with the suction side of the compression device. In this embodiment of the system according to the invention the compression device is capable of operating at the ambient temperature, so that the losses of cold or heat are minimized. A further advantage resides in that the seal of the compression device may also be carried out in a much simpler manner, since this can be done at room temperature.

The losses involved in the heat exchanger communicating with the compression device are low, since the flow of medium passing through said heat exchanger are only small.

A further system embodying the invention comprises a cold-gas refrigerator as a source of cold. It comprises one or more spaces of variable volume, communicating with one or more spaces also of variable volume, in which, in operation, a lower mean temperature prevails than in the first-mentioned space while the junction between each pair of said spaces includes at least one regenerator which can be traversed by a reciprocating flow of working medium. This system constructed in accordance with the invention is characterized in that the working medium of the cold-gas refrigerator is the same as that of the duct system while the walls of said spaces of the cold-gas refrigerator are provided with at least one medium outlet and at least one medium inlet. The outlet communicates with the primary medium supply from the ejector and the inlet communicates with the medium outlet of the duct system.

In this embodiment the cold-gas refrigerator serves both as a source of cold and as a supplier of the primary medium required for the ejector. Since only a small flow of gas need be drawn from the cold-gas refrigerator, the latter is affected very little. The small drained flow suffices for causing a large quantity of medium to circulate through the duct system, so that the temperature differences across the heat exchangers may be small.

The disposition of the inlet and outlet valves in the walls of the refrigerator may be chosen arbitrarily. If, however, the valves are accommodated in the wall of a space having a higher mean temperature than the source of cold with which the duct system concerned cooperates, the medium must be brought to the temperature of the duct system in one or more heat exchangers before it is supplied to the primary inlet of the ejector. In order to avoid this, a further advantageous embodiment of the system is characterized in that the inlet and the outlet of the cold-gas refrigerator are both arranged in the wall of the space in which, in operation, the lowest mean temperature prevails.

A further system embodying the invention comprises a compression device, the outlet of which communicates with a first heat exchanger, in which compressed medium can exchange heat with expanded medium, and which is connected with a second heat exchanger in which the compressed medium can exchange more heat with the expanded medium. The outlet of the latter heater exchanger communicates with an expansion device while at least part of the expanded medium can flow back through said heat exchangers to the suction side of the compression device. This system is characterized in that the outlet of compressed medium of the first heat exchanger communicates with the primary medium supply of the ejector while the medium outlet of the duct system communicates with said second heat exchanger.

In this way an extremely advantageous combination of the source of cold, a duct system for the transfer of cold and a compression-expansion-system is obtained. The source of cold supplies cold to the compression-expansion circulation and to a place to be cooled. The place to be cooled may be formed by a radiation screen surrounding the compression-expansion system and serving for installation.

A further embodiment of the system according to the invention comprises a plurality of sources of cold having different mean tempertaures and provided each with a duct system for transferring cold to a place to be cooled. The system comprising furthermore a compression device, the outlet of which communicates with a plurality of series-connected heat exchangers, in which compressed medium can exchange heat with expanded medium and the outlet of the last heat exchanger communicates with an expansion device while at least part of the expanded medium can flow through said heat exchangers to the suction side of the compression device. This system is characterized in that between each pair of communicating heat exchangers the outlet of compressed medium of one heat exchanger communicates with the primary medium supply of the ejector, which is included in the duct system cooperating with the source of cold which supplies cold at a temperature corresponding with the temperature at which the expanded medium leaves the other heat exchanger, the medium outlet of said duct system communicating with the inlet of compressed medium of the other heat exchanger. In this system part of the cold supplied by the sources serves for cooling the medium circulating through the compression-expansion system. The other part of the produced cold is used for cooling different places at different temperatures. These places may be formed also by radiation screens surrounding the cold part of the compression-expansion system and forming in this way a very effective isolation.

The invention will be described more fully with reference to the drawing.

Figure 1:
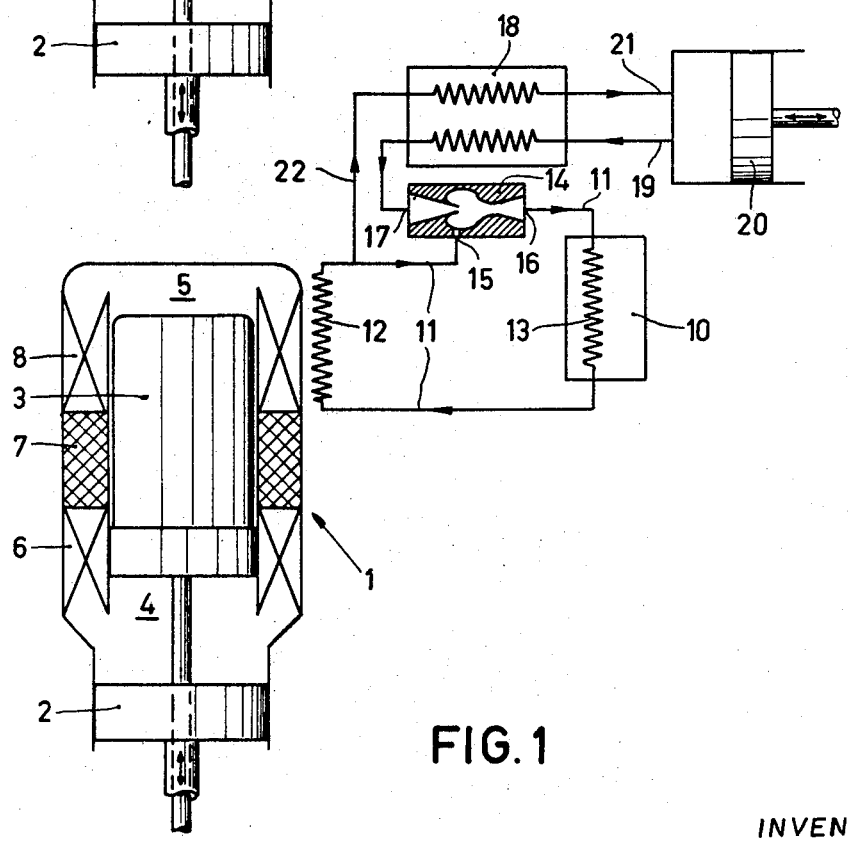
FIG. 1 shows diagrammatically a system comprising a duct system in which a medium can circulate for conveying cold from a source of cold, shown here as a cold-gas refrigerator, to a place to be cooled. The medium is circulated by means of a compressor which cooperates with an ejector.

Referring to the drawings and especially FIG. 1, reference numeral 1 designates a cold-gas refrigerator. This cold-gas refrigerator comprises a piston 2 and a displacer 3, which are connected with a driving gear (not shown) and which is capable of moving the piston and the displacer with given phase difference. By this movement the volumes of a compression space 4 and of an expansion space 5 are varied. The compression space 4 and the expansion space 5 communicate with each other through a cooler 6, a regenerator 7 and a freezer 8. In the working space of the refrigerator a working medium is provided, which is contained, during the expansion, for the major part in the expansion space 5, where it supplies cold at a given low temperature. This cold serves for cooling an enclosed space 10 located at a distance from the cold-gas refrigerator. The transfer of cold from the freezer 8 to the space 10 to be cooled is carried out with the aid of a medium circulating through a duct system 11. This duct system 11 includes a heat exchanger 12, in which the medium is in thermal contact with the freezer 8, and a heat exchanger 13 having a medium which is in thermal contact with the space 10 to be cooled. The duct system includes furthermore an ejector 14, the suction side 15 and the outlet side 16 of which communicate with the duct system 11. The supply side 17 of primary medium communicates through a heat exchanger 18 with the outlet 19 of compressed medium of a compressor 20.

The inlet 21 of the compressor 20 communicates through the heat exchanger 18 with a medium outlet 22 of the duct system 11.

The operation of the cold-gas refrigerator is known.

The cold transferring system operates as follows:

The compressor 20 supplies high-pressure medium to the primary inlet side 17 of the ejector. The supplied medium, since it has passed through the heat exchanger 18, has substantially the same temperature as the medium circulating through the duct system. Thereafter, the pressure of the supplied medium is lowered in the ejector. During the passage through the ejector this medium exerts a suction effect so that a given flow of medium enters the suction side 15 of the ejector. This medium drawn in will leave, together with the primary medium, the outlet opening 16 of the ejector. It will be obvious that the circulating flow of medium of the duct system 11 is greater, and, if desired, considerably greater than the supplied flow of primary medium. This has various advantages. One of these advantages is that the large flow of medium in the duct system 11 causes the temperature difference across the heat exchangers 12 and 13 to be small. Nevertheless, the desired quantity of cold is transferred. The space 10 may thus assume a very uniform, low temperature, which is important for example for electronic circuit-arrangements.

The small primary medium flow results in the compressor 20 being small. A further advantage of the small primary medium flow is that in the heat exchanger 18 very small losses will occur.

The compressor 20 operates in this system at room temperature, which is advantageous with respect to sealing and insulation. Instead of using a piston compressor, other types of compressors may, of course, be employed.

Although FIG. 1 shows a cold-gas refrigerator as a source of cold, the cold transferring system may, of course, be used with like results and with the same advantages in conjunction with other sources of cold. The transferring system shown in FIG. 1 may be used without the need for further means for transferring heat from a source of heat to a space to be heated. This may apply to the use of said transferring system in conjunction with a nuclear reactor or in a central heating system.

Figure 2:
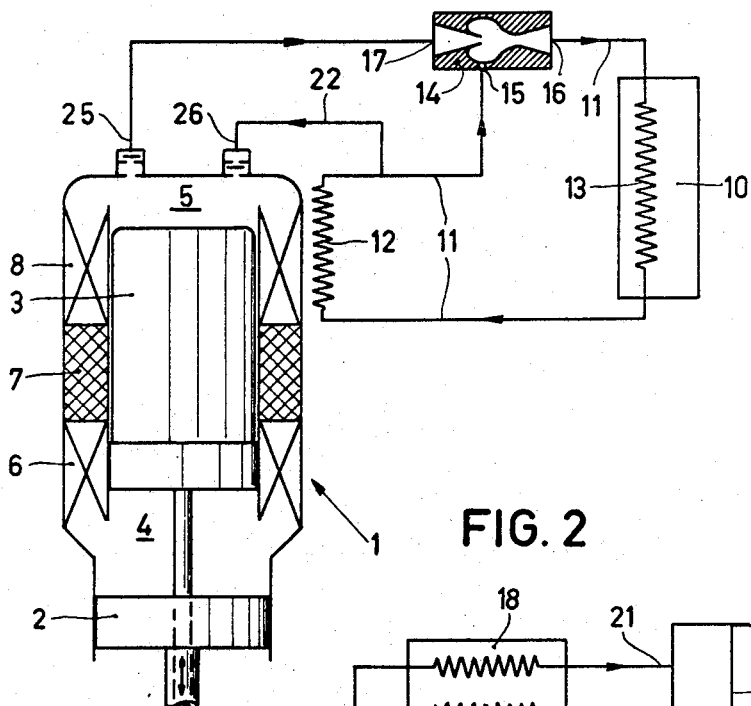
FIG. 2 shows diagrammatically, not to scale, a system comprising a cold-gas refrigerator and a duct system in which a medium can circulate for transferring cold from the refrigerator to a place to be cooled. In this system the medium is caused to flow by means of an ejector which receives the primary medium from the cold-gas refrigerator.

FIG. 2 shows a further embodiment of the present invention in which corresponding parts are designated by the same reference numerals. The cold-gas refrigerator 1 comprises an outlet valve 25 and an inlet valve 26, both arranged in the wall of an expansion space 5. The outlet valve 25 communicates with the supply side 17 of primary medium of the ejector 14. The medium outlet 22 of the duct system 11 communicates with the inlet valve 26. During a short period of the cycle of the cold-gas refrigerator the outlet valve 25 is opened so that a given flow of medium can flow to the inlet side 17 of the ejector. Due to the effect of the ejector a small flow of medium may suffice for obtaining an adequate circulation of medium in the duct system 11. The small flow of medium leaving the valve 25 hardly affects the operation of the refrigerator. The medium conducted away can be conducted to the refrigerator through the valve 26 at another time. An extremely compact system is obtained in this manner.

Figure 3:
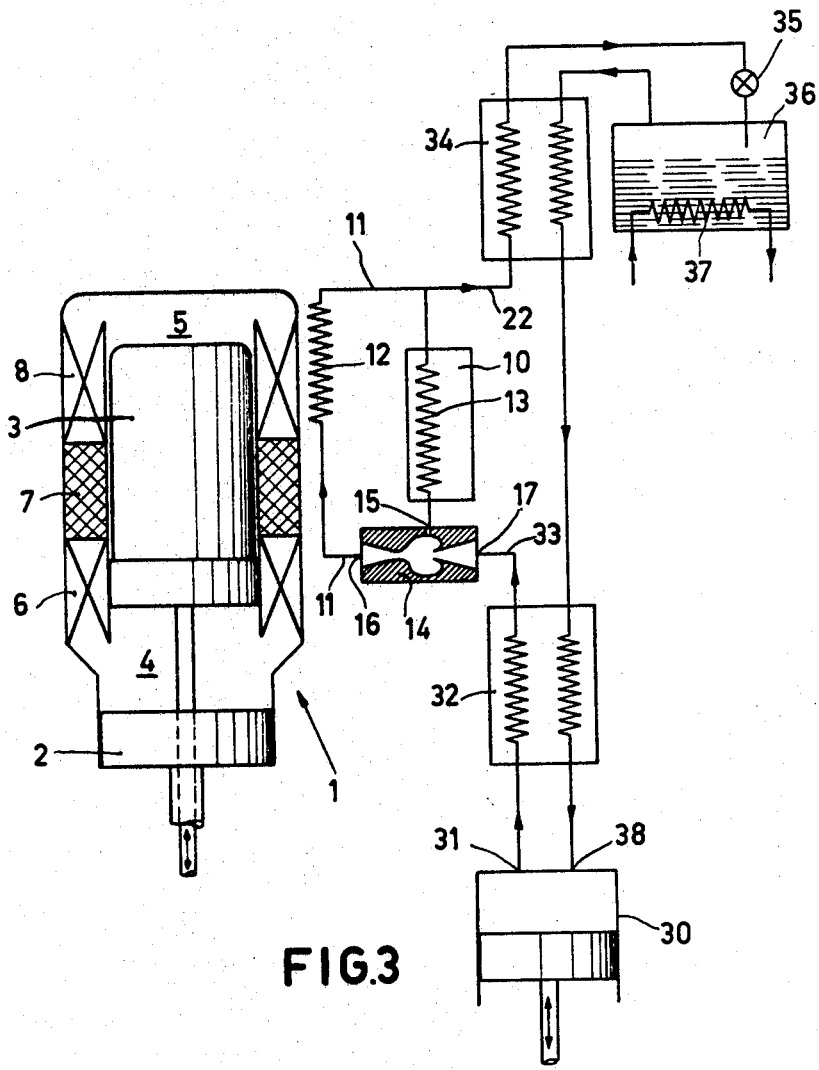
FIGS. 3 and 4 show diagrammatically two embodiments of systems comprising a Joula-Kelvin system and a cold-gas refrigerator. The cold-gas refrigerator serves for pre-cooling the compressed medium of the Joule-Kelvin system and for cooling a preselected space.

FIG. 3 shows diagrammatically a system comprising a cold-gas refrigerator 1, in which like parts bear the same reference numerals as FIGS. 1 and 2. The system comprises furthermore a duct system 11 and includes a Joule-Kelvin system formed by a compressor 30, the outlet 31 of compressed medium of which communicates with a first heat exchanger 32. The outlet 33 of compressed medium of this heat exchanger communicates with the supply side 17 of the ejector 14. The medium outlet 22 of the duct system 11 communicates with a second heat exchanger 34. The outlet of compressed medium of the second heat exchanger 34 communicates with an expansion valve 35. The expanded medium is collected in a reservoir 36 where it can exchange heat with a helix 37, in which a medium to be cooled is contained. Instead of using an expansion valve a different expansion member may be employed. The gaseous medium leaves the reservoir 36 and flows through the heat exchangers 34 and 32 back to the inlet 38 of the compressor 30.

The high-pressure medium leaving the heat exchanger 32 passes through the ejector 14, after which it is in thermal contact in the heat exchanger 12 with the freezer 8 of the cold-gas refrigerator 1. Then the medium flows partly through the outlet 22 to the heat exchanger 34 and partly through the space 10 to be cooled, which in this case is heat exchanger 13, to the suction side 15 of the ejector. Consequently, the heat exchanger 12 is traversed by a greater quantity of medium than is supplied through the duct 33 and it is even possible that also the quantity flowing through the heat exchanger will be greater than the flow of medium conducted away or supplied respectively. In this way a large circulation is maintained in the duct system 11 while the primary medium flow is comparatively small.

In this system the medium flow of the Joule-Kelvin system is cooled by the refrigerator. The medium flowing through the outlet 22 is colder than the supplied primary medium. Apart therefrom a circulation is maintained in the duct system 11 for transferring cold from the freezer 8 to the space 10 to be cooled. This space to be cooled may be formed in this system by a radiation screen surrounding the cold part of the Joule-Kelvin system for preventing the penetration of heat. The refrigerator of this system may, of course, be replaced by a different source of cold without the need for changing the system.

Figure 4:
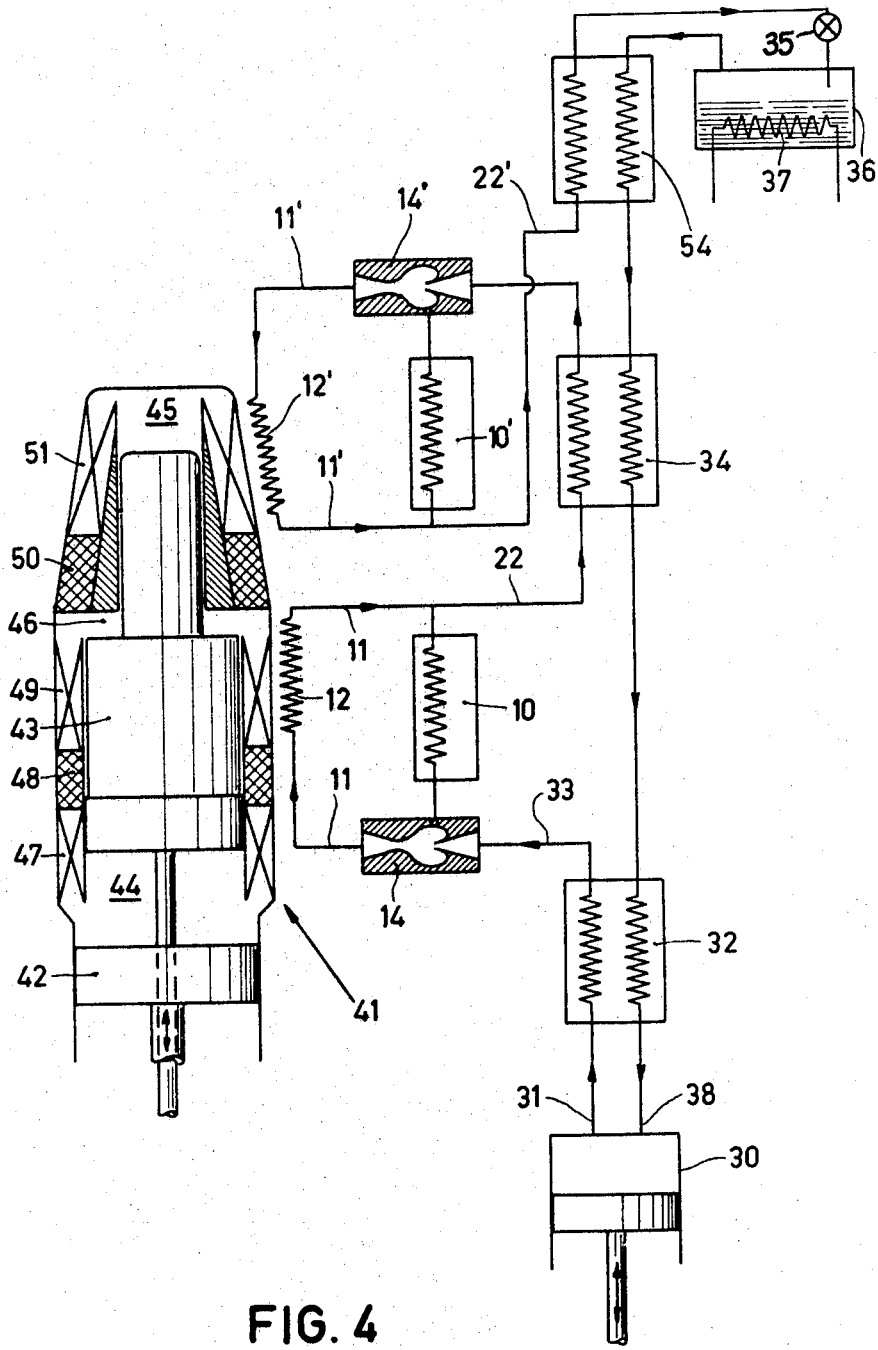

FIG. 4 shows a system which corresponds in principle with the system shown in FIG. 3. It comprises, however, two sources of cold, which supply cold at different temperatures. These sources are formed by two expansion spaces of a two-stage cold-gas refrigerator 41. This refrigerator comprises a piston 42 and a displacer 43, consisting of two portions of different diameters. The displacer and the piston are connected with a driving gear (not shown), which is capable of moving said displacer and piston with a relative phase difference. By this movement the piston and the displacer vary the volumes of the compression space 44 and of the two expansion spaces 45 and 46. The compression space 44 communicates through a cooler 47, a regenerator 48 and a first freezer 49 with the expansion space 46, which communicates through a regenerator 50, a second freezer 51 with the expansion space 45. The mean temperature at which the cold is produced in the expansion space 46 is higher than that at which the cold is produced in the expansion space 45. The system furthermore comprises two duct systems 11 and 11', in which medium can circulate for transferring cold from the freezer 49 and 51 respectively to spaces 10 and 10' to be cooled respectively. The system furthermore comprises a Joule-Kelvin system formed by a compressor 30, three heat exchangers 32, 34 and 54, and an expansion valve 35. There is also provided a reservoir 36 for collecting the expanded medium.

The high-pressure medium leaving the heat exchanger 32 is supplied as the primary medium through the duct 33 to the ejector 14. This medium ensures a large circulation of medium in the duct system 11, this medium leaves this system in a cooled state through the outlet to flow to the heat exchanger 34. The circulating medium of the duct system 11 transfers the cold from the freezer 49 to the first space 10 to be cooled, for example the outer radiation screen surrounding the cold portion of the Joule-Kelvin system. The medium leaving the heat exchanger 34 is again supplied to an ejector 14', which is included in the duct system 11'. Therein the medium is cooled and a circulation of medium is maintained in the duct system 11' so that cold from the freezer 51 is transferred to a second space 10' to be cooled, for example a second radiation screen arranged inside the former. In this way it is ensured that the medium of the Joule-Kelvin system is precooled at two temperatures which is conducive to efficiency. If desired, the number of cold sources may be greater.

On the other hand, instead of using a multi-stage refrigerator, a number of single-stage cold-gas refrigerators may, of course, be employed, which produce cold of different temperatures or other cold sources.

Although the figures of the present invention are restricted to systems comprising sources of cold and transferring cold, it will be obvious that the sources of cold may be replaced by sources of heat, without the need for further means for transferring heat. After the foregoing it will be obvious that the invention provides a system in which cold or heat can be transferred in a very efficient manner from the source of cold or heat respectively to a remote location.

What is claimed:

1. An apparatus for transferring cold or heat from a source to a space to be cooled or heated comprising a duct system, a medium circulating in said duct system for transferring said cold or heat, said duct system including at least one heat exchanger in which said medium can exchange heat with said source, and at least one heat exchanger in which said medium can exchange heat with said space to be cooled or heated, a device for circulating said medium in said duct system including at least one ejector, said ejector being provided with an outlet and an inlet, a suction connection for said ejector, said outlet and suction connection communicating with said duct system, and a device adapted to supply to said inlet the same medium which flows in said duct system, said medium being substantially at the same temperature and at a higher pressure than the medium in said duct system.

2. An apparatus for transferring cold or heat from a source to a space to be cooled as claimed in claim 1 further comprising an additional heat exchanger and said device constituting a compression device, said ejector communicating by means of its medium inlet through said additional heat exchanger with the compressed medium outlet of said compression device, the medium outlet of said duct system communicating through said additional heat exchanger with the suction side of said compression device.

3. An apparatus for transferring cold from a cold source to a space to be cooled as claimed in claim 1 comprising a cold gas refrigerator cold source, said cold gas refrigerator having a medium and being provided with at least two spaces of different mean temperatures and of variable volume being interconnected with each other, said interconnection including at least one regenerator through which said medium therein traverses, said medium in said duct system and said medium in said cold gas refrigerator being the same, the walls of said spaces being provided with at least one outlet and one inlet for said medium, and at least one ejector, said outlet communicating with the inlet of said ejector and said inlet communicating with said medium outlet of said duct system.

4. An apparatus for transferring cold to a space to be cooled as claimed in claim 3 wherein the inlet and the outlet of said cold gas refrigerator are both provided in the wall of said space having, in operation, the lower means temperature.

5. An apparatus for transferring cold or hot from a source to a space to be cooled or heated as claimed in claim 1 further comprising a compressor, the outlet of said compressor communicating with a first said heat exchanger, the compressed medium in said first heat exchanger communicating with another heat exchanger, said compressed medium in said other heat exchanger exchanging further heat with the expanded medium, an expansion device, the outlet of said other heat exchanger communicating with said expansion device, and at least part of said expanded medium being adapted to flow back through said heat exchangers to the suction side of said compressor, and the outlet of the compressor medium of said first heat exchanger communicating with the primary medium supply side of said ejector while the medium outlet of said duct system communicates with said other heat exchanger.

6. An apparatus for transferring cold to a space to be cooled as claimed in claim 3 further comprising a plurality of cold sources at different temperatures, each of said cold sources being provided with a duct system for transferring cold from the respective source to a remote location to be cooled, a compressor, a plurality of series-connected heat exchangers, the outlet of said compressor being connected to said heat exchangers, the compressed medium exchanging heat with the expanded medium in said heat exchangers, an expansion device, the outlet of said last heat exchanger communicating with said expansion device, and at least part of the expanded medium flowing back through said heat exchangers to the suction side of said compression device, between each pair of communicating heat exchangers the outlet of compressed medium from one heat exchanger communicates with the supply side of the medium in said ejector, said duct system being supplied with cold from said cold sources at temperatures which correspond with the temperature at which the expanded medium leaves another heat exchanger, and the medium outlet of the duct system communicates with the inelt of compressed medium of said other heat exchanger.

References Cited

UNITED STATES PATENTS

| | | | |
|---|---|---|---|
| 2,049,946 | 8/1936 | Christofferson | 62—500 |
| 2,764,877 | 10/1956 | Kohler | 62—6 |
| 3,101,596 | 8/1963 | Rinia | 62—6 |
| 3,218,815 | 11/1965 | Chellis | 62—6 |
| 3,276,216 | 10/1966 | Papapanu | 62—500 |

WILLIAM J. WYE, *Primary Examiner.*

UNITED STATES PATENT OFFICE
CERTIFICATE OF CORRECTION

Patent No. 3,383,871                          May 21, 1968

Johan Adriaan Rietdijk et al.

It is certified that error appears in the above identified patent and that said Letters Patent are hereby corrected as shown below:

Column 1, line 59, "injector" should read -- ejector --. Column 3, lines 9 and 10, "installation" should read -- insulation --. Column 6, line 73, "means" should read -- mean --. Column 8, line 13, "inelt" should read -- inlet --.

Signed and sealed this 7th day of October 1969.

(SEAL)
Attest:

Edward M. Fletcher, Jr.                        WILLIAM E. SCHUYLER, JR.
Attesting Officer                                Commissioner of Patents